United States Patent
Holmlund

(10) Patent No.: US 8,553,108 B2
(45) Date of Patent: Oct. 8, 2013

(54) METHOD OF COMPENSATING FOR TURBULANCE WHEN RECORDING FILM SEQUENCES

(75) Inventor: Johan Holmlund, Stockholm (SE)

(73) Assignee: Flir Systems AB, Danderyd (SE)

( * ) Notice: Subject to any disclaimer, the term of this patent is extended or adjusted under 35 U.S.C. 154(b) by 0 days.

(21) Appl. No.: 13/392,528

(22) PCT Filed: Aug. 12, 2010

(86) PCT No.: PCT/SE2010/000201
§ 371 (c)(1),
(2), (4) Date: Apr. 24, 2012

(87) PCT Pub. No.: WO2011/025428
PCT Pub. Date: Mar. 3, 2011

(65) Prior Publication Data
US 2012/0200720 A1 Aug. 9, 2012

(30) Foreign Application Priority Data
Aug. 27, 2009 (SE) .................................... 0901125

(51) Int. Cl.
*H04N 7/18* (2006.01)
*H04N 5/228* (2006.01)
*H04N 5/217* (2011.01)

(52) U.S. Cl.
USPC ...................... 348/241; 348/144; 348/208.99

(58) Field of Classification Search
USPC .............. 348/144, 147, 208.99, 208.1, 208.4, 348/208.12, 241
See application file for complete search history.

(56) References Cited

U.S. PATENT DOCUMENTS

| 5,841,911 A | 11/1998 | Kopeika et al. |
| 2004/0005098 A1 | 1/2004 | Carrano et al. |
| 2005/0041842 A1 | 2/2005 | Frakes et al. |
| 2007/0030542 A1 | 2/2007 | Grasso et al. |

FOREIGN PATENT DOCUMENTS

| WO | WO-0013407 A1 | 3/2000 |
| WO | WO-0052633 A1 | 9/2000 |
| WO | WO-2009087641 A2 | 7/2009 |

OTHER PUBLICATIONS

PCT/ISA/210—International Search Report—Dec. 9, 2010.
PCT/ISA/237—Written Opinion of the International Searching Authority—Dec. 9, 2010.
D. Frakes et al.; "Suppression of atmospheric turbulence in video using an adaptive control grid interpolation approach", 2001 IEEE International Conference on Acoustics, Speech, and Signal Processing, vol. 3, pp. 1881-1884.
J. Giles; "Restoration algorithms and system performance evaluation for active imagers"; Proc. of SPIE vol. 6739 67390B-1 (2007).

*Primary Examiner* — Daniel M Pasiewicz
(74) *Attorney, Agent, or Firm* — Venable LLP; Eric J. Franklin

(57) ABSTRACT

A method of compensating for atmospheric turbulence when recording film sequences. A frame for an image that is being currently recorded is compared at pixel level with a number of frames recorded earlier. Each pixel value in a current frame is compared with pixel values in earlier frames. A matrix is adjusted upward by one unit at positions where a new value is encountered at the positions. Values adjusted upwards in the matrix are retained for a limited number of frame comparisons. A summing window is drawn over the matrix and movement is deemed to have occurred in areas where a sum from the summing window exceeds a limit value. A compensated frame is created. All pixel values in areas where the summing window exceeds the limit value are derived from the current frame. Other values are derived through a temporal median filtering of a number of earlier frames recorded.

8 Claims, 2 Drawing Sheets

METHOD OF COMPENSATING FOR TURBULENCE WHEN RECORDING FILM SEQUENCES

CROSS-REFERENCE TO RELATED APPLICATIONS

This application claims priority under 35 U.S.C. §119 to Swedish patent application 0901125-5 filed 27 Aug. 2009 and is the national phase under 35 U.S.C. §371 of PCT/SE2010/000201 filed 12 Aug. 2010.

FIELD OF THE INVENTION

The present invention relates to a method of compensating for turbulence in the atmosphere when recording film sequences by means of image-recording devices such as cameras, the frame for an image that is being currently recorded being compared at pixel level with a number of frames recorded earlier.

BACKGROUND OF THE INVENTION

The image quality and the range at which a camera could be used have long been primarily dependent on internal physical parameters such as the size and quality of the lenses, the resolution and accuracy in the detector, the absence of vibrations etc. These parameters are restrictive even today. When seeking to record images at longer ranges in hot terrains, especially in desert landscapes and over ocean surfaces, account needs to be taken of yet another parameter, namely the phenomenon of turbulence. The phenomenon may be discerned, for example, above a motorway on a hot summer's day, when the air seems to quiver. In such environments the turbulence phenomenon imposes direct limits on what can be imaged. Regardless of how sharply and accurately modern cameras present the ray path from the imaged object, the image lacks the information sought, since it gets lost before the ray path even reaches the camera. One specific sphere of application that might be mentioned is border surveillance in a desert landscape, where the turbulence phenomenon greatly limits the ability of the camera to form an image of distant objects and to distinguish real movements in a video clip, especially those of limited extent.

The turbulence phenomenon originates in variations in the refractive index of the air, which varies with the atmospheric temperature. When the sun heats up an area of land mass the air above this is also heated. The warm air will then rise upwards, like bubbles from a diver. Just like the air bubbles from a diver, these bubbles will also be broken down into smaller and smaller intact masses. When the ray path passes through an area with 'bubbles drifting around' having a varying refractive index, its direction will be modified in just the same way as when it passes through a lens. In most cases the bubbles are small in relation to the view, so that different parts of the ray path are affected differently. Since they also move, the ray path will also be refracted differently from one frame to the next. This is the reason why the aforementioned quiver occurs and why over time varying deformations of the object in the image occur. The turbulence also causes contours in the image to become blurred.

A known method of restoring image information caused by atmospheric turbulence is to perform temporal median filtering of an image sequence pixel by pixel. Reference may be made in this context to the article by J. Gilles: Restoration algorithms and system performance evaluation for active imagers, Proc. of SPIE Vol. 6739, pages 67390B-1-67390B-8. The known method cited above is primarily suited to stabilizing a basically fixed view.

Methods have also been proposed for detecting movement in which sub-frames of the image are supplied with calculated movement vectors by analysing where they best fit into a reference view, see for example D. H. Frakes, J. W. Monaco, M. J. T. Smith; Suppression of Atmospheric turbulence in video using an adaptive control grid interpolation approach; Proc. IEEE Internal Conference on Acoustics, Speech and Signal Processing, vol. 3, pp 1881-1884, November 2001. These proposed known methods are calculation-intensive and also require that the majority of the sub-frames contain homogeneous linear movements and, for example, that an individual who is turning around on the spot should not be detected as a moving object. After extensive calculations the latter principle of the method allows compensation for turbulence without removing actual movement of large objects that move linearly.

SUMMARY OF THE INVENTION

The object of the present invention is to afford a method of compensating for atmospheric turbulence that is capable of handling small-sized moving objects without requiring so much calculation and without being obliged to specify how real movements must appear.

The object of the invention is achieved by performing a method characterized by the following steps:
- each pixel value $I(x,y)$ in the current frame is compared with pixel values $(I(x,y\pm n)$ in earlier frames, where $|n|$ assumes one or more of the values 0, 1 or 2
- at the positions $(x,y)$ where a new value is encountered the value at a corresponding position $(x,y)$ in a matrix M is adjusted upwards by one unit
- values adjusted upwards in the matrix are retained for a limited number of frame comparisons
- a summing window is drawn over the matrix and movement is deemed to have occurred in areas where the sum from the summing window exceeds a limit value
- a compensated frame is created in that all pixel values in areas where the summing window exceeds the limit value are derived from the current frame, whilst other values are derived through a temporal median filtering of a number of earlier frames recorded.

The proposed method is capable of compensating for transient deformations, scintillations, and blurring caused by turbulence. In contrast to the known method, scintillations without real movements are explicitly defined, and not real movements. By defining these scintillations as pixel areas with semi-cyclical pixel value histogram and only stabilizing these areas, a very robust method for handling small objects inherently moving at random together with a method for suddenly emerging objects have been created. The advantages, among other things in terms of the calculations, are great compared to methods that compare movement vectors for pixel blocks calculated between two frames. Another important advantage is that all movements which are not of a 'quivering' nature, not just linear movements, will be retained, as well as suddenly emerging objects.

Among other things, the method proposed has been shown to be capable of detecting leg movements of a person at a range of 4.5 kilometres under heavy turbulence in a desert landscape.

The compensated frame advantageously undergoes a Lucy-Richardson filtering, L-R filtering, in order to increase the sharpness of the image. Examples of references that describe L-R filtering are:

W. H Richardson. Bayesian-based iterative method of image restoration. JOSA vol. 62, pp. 55-59, January 1972, and L. B. Luccy. An iterative technique for the rectification of observed distributions. The Astronomical Journal vol. 79, pp 745-754, June 1974.

According to a proposed method according to the invention each pixel value I(x,y) in the current frame is compared with pixel values I(x,y±2) in earlier frames. The limiting to |n|=2 requires shorter time histograms whilst achieving effective compensation of the quiver.

According to another proposed method according to the invention values adjusted upwards in the matrix are retained for four to six forthcoming frames. The proposed number of frames is easy to handle in calculation terms whilst it has been shown to be well capable of separating areas in which objects are moving from other frames. It also gives the algorithm an increased sensitivity in precisely detecting very small objects, assuming that they move in approximately the same location in more than one frame, for example a person raising an arm or a weapon.

A suitable summing window proposed is designed to add over the order of magnitude of 10×10 values in the matrix.

Methods proposed according to the invention are well suited to recording images in the IR range. However, the principle of the invention can also be applied in other wavelength ranges, such as the wavelength of visible light.

According to another proposed embodiment each pixel value I(x,y) in the current frame is compared with pixel values I(x,y±n) in a selection of earlier frames in which the most recent frames have been excluded. Excluding the most recent frames ensures that even objects that are moving slowly and especially radiation-homogeneous objects are detected as objects exhibiting real movement.

BRIEF DESCRIPTION OF THE DRAWINGS

The invention will be described further below by means of an exemplary embodiment with reference to drawings attached, of which.

DETAILED DESCRIPTION OF EMBODIMENTS OF THE INVENTION

The invention will now be described with reference to FIG. 1.

The method may comprise the following three main steps:
1. Detection of areas which only contain scintillations, that is to say no real movement.
2. Stabilization of these areas.
3. Compensation for blurredness in the entire frame.

Figure 1:
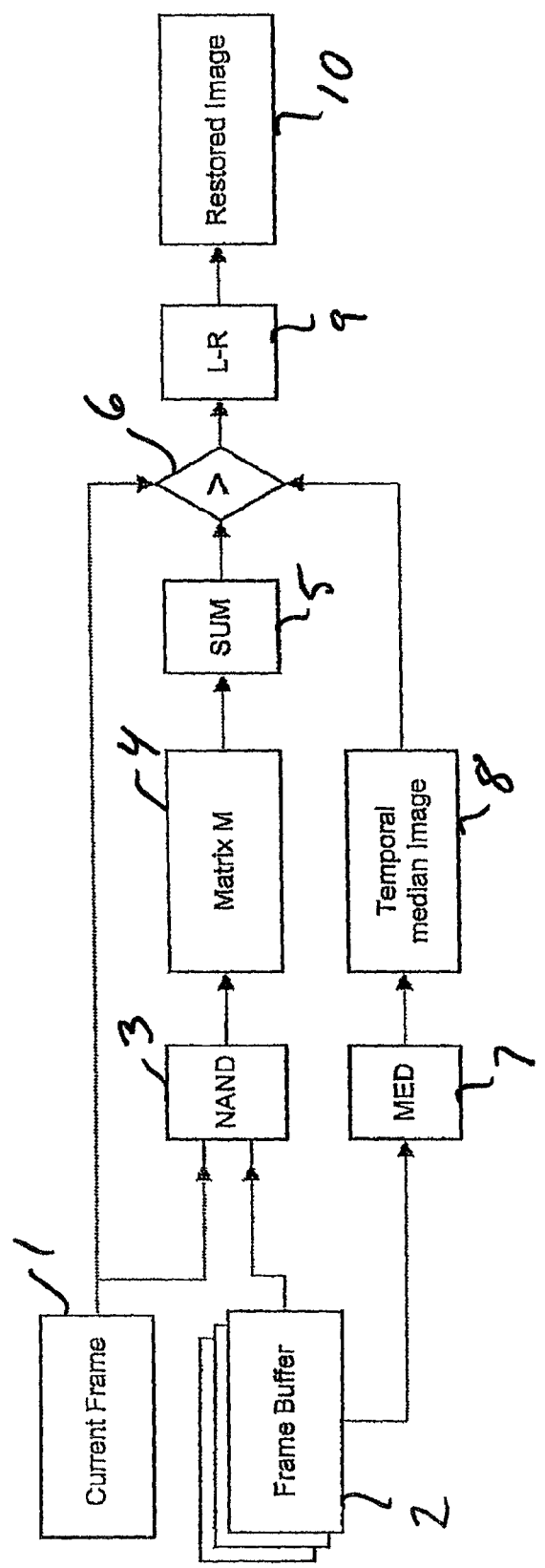
FIG. 1 schematically shows a flow chart illustrating the principle of the proposed method of compensating for turbulence.

According to FIG. 1 a current frame in a video sequence is accessible in block 1. The image may have been obtained from a camera (not shown), such as an IR camera. Corresponding frames taken on earlier occasions are stored in a frame buffer 2. Illustrated by a NAND gate 3 the current frame from block 1 is compared with earlier frames from the frame buffer 2 pixel by pixel, so that each pixel I(x,y) in the current frame is compared with pixels I(x,y±n) in earlier frames, where |n|=0, 1 or 2. In the positions (x,y) where the NAND gate 3 indicates that a 'new' value has been encountered, the position (x,y) is adjusted upwards by one increment, from 0 to 1, in a matrix 4. If no new values are encountered the positions (x,y) will be made to retain the upwardly adjusted value for a limited number of frame comparisons, that is to say a certain period of time. A suitable number of frame comparisons may be four to six comparisons. If, during the period corresponding to five frames, for example, the same pixel is once again encountered with a new value, its value in the matrix 4 is adjusted upwards by a further increment, that is to say from 1 to 2, etc. A summing window 5 is applied to the matrix values for summation of groups of adjacent values, for example in groups of 10×10 values. In those positions of the summing window where the sum of the values exceeds a fixed limit, the area covered by the window is classed as if real movement has occurred throughout the area, that is to say actual movement is deemed to have occurred throughout the area covered by the summing window.

In a gate function 6 it is ensured that the pixels in the areas classified as exhibiting real movement as specified above are given values from the current frame supplied from block 1, whilst other pixel values are retrieved from a temporal median image in a block 8 formed though a temporal median filtering in block 7 of a number of frames recorded earlier.

In order to improve the sharpness of the image the compensated frame accessible via the gate function then undergoes a Lucy-Richardson filtering, which is a filtering process known in the art for improving the sharpness. A block 9 identifies this filtering function. The restored frame is then accessible for retrieval in block 10.

Figure 2:
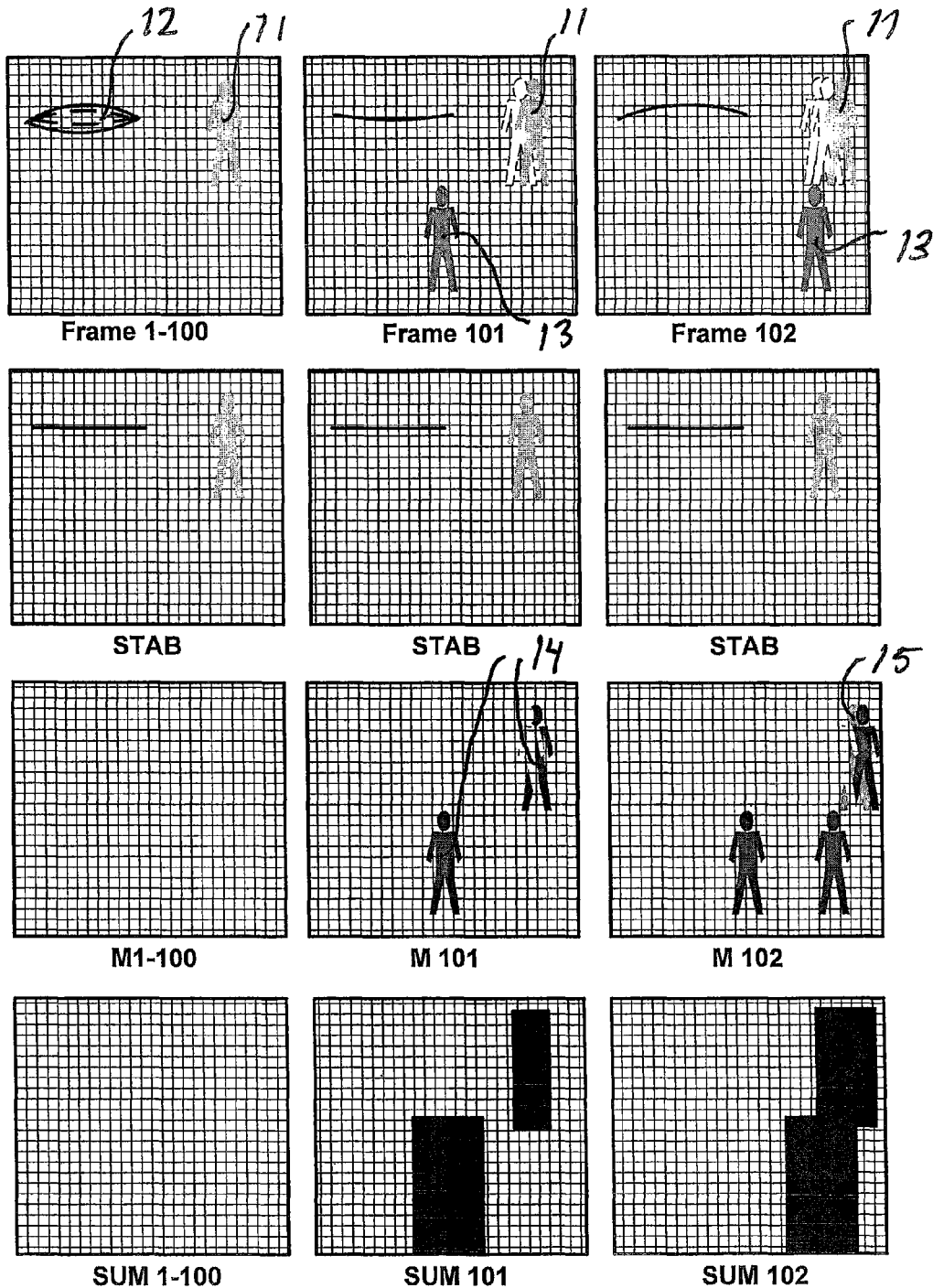
FIG. 2 shows a schematic, simple example of how the content of matrices and frames produced in stages might appear when applying the proposed method of compensating for turbulence.

FIG. 2 shows a schematic example of how the matrices and various frames might appear. In this example we assume that there is no real movement during the first hundred frames 1-100. These frames contain a light grey man 11, who is standing still, and a horizontal line 12, which shimmers due to turbulence. In frame 101 the light grey man 11 begins to move to the right and a dark grey man 13 jumps into the frame. The pixels I(x,y) that are covered by the light grey man 11 in his new position and the pixels that are covered by the dark grey man 13 are marked in the matrix 4 since these pixels assume values not found in the pixel value history, see FIG. 1, in that the position is adjusted upwards and is indicated in the matrix M101 by a black colour and the reference numeral 14.

In frame 102 the light grey man 11 has moved further and the newly covered pixels are again marked in the matrix. The pixels that are marked in the matrix M101 are also marked in the matrix M102 and will be thus marked until M105, since upwardly adjusted values are retained for five frames. In this case some pixels are marked for a second time because the black man 11 is not homogeneous. These pixels 15 have been marked with a mid-grey colour.

Finally the summing window, SUM 101 or SUM 102, marks in black the areas in which the sum of 10×10 pixels in the M matrix attains a fixed limit value. In the areas marked in black no stabilization will occur, whilst the remainder of the frame will contain pixel values from an image stabilized by means of temporal median filtering, that is to say the pixel values from STAB.

In order to detect objects that are moving slowly and especially those which have homogeneous radiation, the method is suitably designed so that the comparison with earlier frames is performed on frames more remote in time to the exclusion of the very recent frames. For example, the last ten to twenty may be excluded. A suitable number of earlier frames for comparison may be in the order of one hundred.

The invention is not limited to the exemplary embodiments described above but can lend itself to modifications without departing from the scope of the following claims.

The invention claimed is:

1. A method of compensating for turbulence in an atmosphere when recording film sequences with image-recording devices, wherein a frame for an image that is being currently recorded being compared at pixel level with a number of frames recorded earlier, the method comprising:
   comparing each pixel value I(x,y) in a current frame is compared with pixel values (I(x,y±n) in earlier frames, where |n| assumes one or more of the values 0, 1 or 2;
   adjusting a matrix M upward by one unit at positions (x,y) where a new value is encountered at the positions (x,y);
   retaining values adjusted upwards in the matrix for a limited number of frame comparisons;
   drawing a summing window over the matrix and deeming movement to have occurred in areas where a sum from the summing window exceeds a limit value; and
   creating a compensated frame in that all pixel values in areas where the summing window exceeds the limit value are derived from the current frame, while deriving other values through a temporal median filtering of a number of earlier frames recorded.

2. The method according to claim 1, wherein the compensated frame undergoes a Lucy-Richardson filtering in order to increase a sharpness.

3. The method according to claim 1, wherein each pixel value I(x,y) in the current frame is compared with pixel values I(x,y±2) in earlier frames.

4. The method according to claim 1, wherein values calculated in the matrix are retained for four to six forthcoming frames.

5. The method according to claim 1, wherein the summing window is designed to add over an order of magnitude 10×10 values in the matrix.

6. The method according to claim 1, wherein the image recording is performed in an IR range.

7. The method according to claim 1, wherein each pixel value I(x,y) in the current frame is compared with pixel values I(x,y±n) in a selection of earlier frames in which the most recent frames have been excluded.

8. The method according to claim 1, wherein the image-recording devices are cameras.

\* \* \* \* \*

UNITED STATES PATENT AND TRADEMARK OFFICE
CERTIFICATE OF CORRECTION

PATENT NO.         : 8,553,108 B2
APPLICATION NO.    : 13/392528
DATED              : October 8, 2013
INVENTOR(S)        : Johan Holmlund Page 1 of 1

It is certified that error appears in the above-identified patent and that said Letters Patent is hereby corrected as shown below:

On the Title Page, Item (54) and in the Specification, Col. 1, line 1-2, title should read

(54) METHOD OF COMPENSATING FOR ~~TURBULANCE~~ <u>TURBULENCE</u> WHEN RECORDING FILM SEQUENCES

On the Title Page, Item (30), should read

(30) Foreign Application Priority Data
Aug. 27, 2009         (SE) ............................ 0901125<u>-5</u>

Signed and Sealed this
Third Day of December, 2013

Margaret A. Focarino
*Commissioner for Patents of the United States Patent and Trademark Office*